United States Patent [19]

Chalilpoyil et al.

[11] Patent Number: 4,840,644
[45] Date of Patent: Jun. 20, 1989

[54] CELL CORROSION REDUCTION

[75] Inventors: Purush Chalilpoyil, Lincoln; Frank E. Parsen, Weston; Chih-Chung Wang, Lexington, all of Mass.

[73] Assignee: Duracell Inc., Bethel, Conn.

[21] Appl. No.: 148,182

[22] Filed: Jan. 26, 1988

Related U.S. Application Data

[60] Continuation of Ser. No. 919,412, Nov. 24, 1987, abandoned, Division of Ser. No. 700,836, Feb. 12, 1986, abandoned.

[51] Int. Cl.$^4$ .......................................... H01M 10/52
[52] U.S. Cl. .................................... 29/623.1; 429/57
[58] Field of Search ............ 429/206, 57.59, 229–231, 429/50; 29/623.1

[56] References Cited

U.S. PATENT DOCUMENTS

| | | | |
|---|---|---|---|
| 3,844,838 | 10/1974 | Louzos | 429/229 X |
| 3,847,669 | 11/1974 | Paterniti | 429/206 |
| 3,853,625 | 12/1974 | Louzos | 429/229 |
| 4,195,120 | 3/1980 | Rossler et al. | 429/50 |
| 4,487,651 | 12/1984 | Wang | 156/616 R |
| 4,579,791 | 4/1986 | Wang | 429/50 |
| 4,585,716 | 4/1986 | Chalilpoyil et al. | 429/206 |

Primary Examiner—Anthony Skapars
Attorney, Agent, or Firm—Ronald S. Cornell; James B. McVeigh

[57] ABSTRACT

Corrosion is reduced in aqueous electrochemical cells having zinc anodes comprised of single crystal zinc particles by the addition of small amounts of a gas inhibiting surfactant, for example, an organic phosphate inhibitor such as RA600 from GAF Corp. to the cell. A synergistically lowered rate of corrosion and cell gassing is obtained even with reduction of mercury content.

1 Claim, No Drawings

CELL CORROSION REDUCTION

This application is a continuation of application Ser. No. 919,412, filed 11-24-87 which application is a division of application Ser. No. 700,836 both now abandoned.

This invention relates to methods utilized in the reduction of corrosion and gassing in aqueous electrochemical cells particularly in alkaline type cells having zinc anodes.

A problem in aqueous electrochemical cells has been the evolution of hydrogen gas in the sealed cell container. Such gassing has resulted in corrosion, leakage of the electrolyte from the cell, cell container deformation and rupture, and a possible hazard when the cell is disposed of in a fire. Various expedients have been utilized in preventing, minimizing and controlling such hydrogen gas evolution and its consequences. Such expedients have included mechanical means such as vents and additional volume for storing the hydrogen without excessive pressure build up. Chemical expedients have included: corrosion and gassing inhibitors such as lead, indium, tin, cadmium, bismuth, thallium, and gallium and surfactant materials such as organic phosphates; hydrogen getters such as rare metals supported on oxides such as platinum supported on aluminum oxide or palladium or finely dispersed nickel mixed with polytetrafluoroethylene and manganese dioxide, and hydrides such as LaNiH; hydrogen recombination with oxygen particularly utilized in nickel cadmium cells; and removal of chemicals such as chlorides from the surface of the anode metal which tend to accelerate corrosion. The most common, most effective and the oldest expedient (particularly in alkaline electrolyte cells) has been the utilization of mercury to amalgamate the anode metal such as zinc to increase the normally high hydrogen overpotential and to provide for a uniform equipotential surface on the anode metal. Recently, with the increase of environmental concerns, reduction or elimination of mercury without substantial concomitant increase in cell corrosion or gassing has been vigorously pursued. For example, in U.S. Pat. No. 4,487,651 (assigned to the same assignee as the present invention), the amount of mercury utilized for protective amalgamation of zinc anodes is disclosed as being reduced from about 7% to about 4% by the use of single crystal zinc particles without ill effect, i.e. without increase in gassing.

It is an object of the present invention to provide a means for further reduction or elimination of mercury in cell anodes without loss of corrosion protection and increase in cell gassing.

This and other objects, features and advantages of the present invention will become more evident from the following discussion.

Generally the present invention comprises a method for making an electrochemical cell subject to reduced gassing by means of utilization of specific materials in specific states; such materials and the cell itself. The method is particularly applicable to a cell having an anode comprised of a mercury amalgamated powdered metal such as zinc. In the method of the present invention the powdered anode metal is substantially formed into individual single crystals and a small amount of a surface active heteropolar substance (surfactant) of a type that will act as a hydrogen evolution inhibitor is added to the cell. Because of the heteropolar nature of the surfactant it is generally at least slightly soluble in the cell electrolyte and has a polar affinity to the surface of the anode metal particles with a coating being formed thereby. Such affinity is particularly marked with respect to zinc particles commonly utilized in anodes of alkaline electrolyte cells. The surfactant may be effectively incorporated in the cell in various ways. For example, it may be added to the anode, incorporated in the electrolyte, or in the separator by pre-wetting or impregnating the separator with the additive. The surfactant may even be added to the cathode. In all such instances the surfactant migrates to the surface of the anode metal particles to form the requisite hydrogen gas inhibiting coating. Adding the surfactant to the anodic material is by direct addition to the powdered metal (amalgamated or unamalgamated) to form a surface coating for the anode metal. Alternatively, the surfactant is added to the electrolyte which is then admixed with the anode metal particles with resultant migration of the surfactant to the surface of the anode metal particles. Migration of the surfactant to the anode metal particles may also be effected by the addition of the surfactant to the separator or the cathode.

Useful surfactants, in accordance with this invention, include ethylene oxide containing polymers such as those having phosphate groups, saturated or unsaturated monocarboxylic acid with at least two ethanolamide groupings; tridecyloxypoly(ethylenoxy) ethanol; and most preferably organic phosphate esters. The preferred organic phosphate esters generally are monoesters or diesters having the following formula:

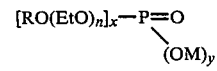

where $x+y=3$ $M=H$, ammonia, amino, or an alkali or alkaline earth metal $R=$ phenyl or alkyl or alkylaryl of 6–28 carbon atoms Specific useful organic phosphate ester surfactants include materials which can be identified by their commercial designation as GAFAC RA600 (an anionic organic phosphate ester supplied by GAF Corp. as the free acid, based on a linear primary alcohol, and being an unneutralized partial ester of phosphoric acid); GAFAC RA610 (an anionic complex organic phosphate ester supplied by GAF Corp. as the free acid, having an aromatic hydrophobe, and being an unneutralized partial ester of phosphoric acid); and KLEARFAC AA-040 (an anionic mono substituted ortho phosphate ester supplied by BASF Wyandotte Corp).

It has been found that the incorporation of a surfactant additive of the type referred to herein in a cell in an amount of from 0.001% to 5%, preferably 0.005 to 1%, and most preferably 0.01 to 0.3% by weight of the active anode component of the cell, precludes or at least significantly inhibits the evolution of hydrogen within the cell, and thereby increase its shelf life and its useful work life.

Though the use of single crystal anode material and the use of organic phosphate ester surfactants (U.S. Pat. Nos. 4,487,651 and 4,195,120 owned by the same assignee as the present invention) have separately been known to effectively reduce cell gassing or to permit some reduction of mercury content in the anode without detrimental increase in gassing, the effect of the combination has unexpectedly been discovered to be considerably more than additive. Thus, in cells having amalgamated single crystal zinc anodes, the amount of mercury in the amalgam can be effectively reduced from about 6-7% to about 4% or stated differently the rate of gassing of polycrystalline zinc amalgam containing 1.5% mercury can be reduced by about 2-fold with the use of single crystal zinc. Similarly the utilization of an organic phosphate ester surfactant such as GAFAC RA600 with polycrystalline zinc amalgam anodes results in about a 4-fold reduction of gassing with for example 0.1% GAFAC RA600. However, in accordance with the present invention, a combination of the two, i.e. a single crystal zinc amalgam with a surfactant unexpectedly permits the effective reduction of the mercury to about 1.5% with about a 20-fold gassing rate inhibition or about three times what might have been expected. As a matter of course, combination of chemical gas reduction expedients does not usually even provide an additive effect nor does excessive utilization of additives.

The single crystals of zinc are preferably prepared as described in said U.S. Pat. No. 4,487,651, the disclosure of which is incorporated herein by reference thereto. Such procedure involves the formation of a thin skin crucible on each of the zinc particles by oxidation in air at a temperature just below the melting point (419° C.) of the zinc, heating of the skin enclosed zinc particles in an inert atmosphere above the melting point of the zinc and slow cooling thereafter with removal of the oxide skins. Zinc particle sizes generally range between 80 and 600 microns for utility in electrochemical cells and such method provides an effective means for making single crystal particles of such small dimensions.

The amount of mercury in the anode amalgam may range from 0-4% depending upon the cell utilization and the degree of gassing to be tolerated.

The amalgamated single crystal metal particles with surfactant additives such as GAFAC RA600 are formed into anodes for electrochemical cells particularly alkaline electrochemical cells. Alternatively, the anodes are formed from the single crystal metal particles and the surfactant migrates thereto from other cell components such as the electrolyte, separator or cathode to which the surfactants have been initially added. Such cells generally have anodes of zinc and cathodes of materials such as manganese dioxide, silver oxide, mercuric oxide and the like. Electrolytes in such cells are generally alkaline and usually comprise hydroxide solutions such as of sodium or potassium hydroxide. Other anode metals capable of being formed into single crystal powders and which are useful in electrochemical cells include Al, Cd, Ca, Cu, Pb, Mg, Ni, and Sn.

The effects of the present invention can be more clearly evidenced by consideration of comparative gassing rates and discharge capacities as shown in the following examples. It is understood that such examples are for illustrative purposes and are not to be construed as a limitation on the present invention. In the examples as well as throughout this discussion all parts are parts by weight unless otherwise indicated.

EXAMPLE

Zinc powder amalgams containing 1.5% mercury are made with polycrystalline zinc alone, polycrystalline zinc with 0.1% RA600 as an additive element, single crystal zinc, and single crystal zinc with 0.1% RA600 as an additive element. Equal amounts of the amalgam powders are then placed in equal amounts of 37% KOH alkaline solution (typical electrolyte solution of alkaline cells) and tested for gassing at a temperature of 71° C. The 0.1% GAFAC RA600 is added to the alkaline solution and stirring of the zinc in such solution results in the deposition of the surfactant on the zinc. The amount of gassing, measured in microliters/gram per day (uL/g-day) and the rate reduction factors (with the polycrystalline zinc control being 1) are set forth in the following Table:

TABLE

| ANODE MATERIAL | GASSING RATE | RATE REDUCTION FACTOR |
|---|---|---|
| Polycrystalline zinc, 1.5% Hg | 295 | 1 |
| Polycrystalline zinc, 1.5% Hg 0.1% RA600 | 80 | 3.7 |
| Single crystal zinc, 1.5% Hg | 140 | 2.1 |
| Single crystal zinc, 1.5% Hg 0.1% RA600 | 15 | 19.7 |

A rate reduction factor (if any) would at most have been expected to be about 7.8 (3.7×2.1) for a combined utilization of single crystal zinc and RA600 with a gassing rate reduction to about 38 uL/g-day. The combination however synergistically reduces the gassing to about double the expected reduction.

It is evident from the above example and table that the single crystal zinc with one or more additives of the present invention is markedly effective in permitting large mercury reductions without increase in cell gassing.

It is understood that the above example is for illustrative purposes only and details contained therein are not to be construed as limitations on the present invention. Changes in cell construction, materials, ratios and the like may in fact be made without departing from the scope of the present invention as defined in the following claims.

What is claimed is:

1. A method for reducing the gassing of an anode subject to gassing, said method comprising the steps of making single crystal particles of the metal utilized as the active anode of said cell; forming said single crystal particles ino an anode for said cell wherein said anode comprises mercury amalgamated single crystal particles and wherein said mercury is present in said anode in an amount less than about 1.5% by weight thereof; and adding a surface active heteropolar material having a polar affinity to said anode to said cell, wherein said heteropolar material comprises an organic phosphate ester having the formula:

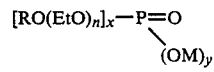

where $x+y=3$

M=H, ammonia, amino, or an alkali or alkaline earth metal and R=phenyl or alkyl or alkylaryl of 6-28 carbon atoms.